US008870020B2

(12) United States Patent
Eckstein et al.

(10) Patent No.: US 8,870,020 B2
(45) Date of Patent: Oct. 28, 2014

(54) CLOSURE DEVICE FOR A HOUSING, SEALED OFF FROM THE ENVIRONMENT, AND A HOUSING

(75) Inventors: Frank Eckstein, Munich (DE); Hubertus Goesmann, Nattheim-Auernheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 281 days.

(21) Appl. No.: 13/371,850

(22) Filed: Feb. 13, 2012

(65) Prior Publication Data
US 2012/0169195 A1 Jul. 5, 2012

Related U.S. Application Data

(63) Continuation of application No. PCT/EP2010/003892, filed on Jun. 24, 2010.

(30) Foreign Application Priority Data

Aug. 12, 2009 (DE) .......................... 10 2009 037 181

(51) Int. Cl.
| B65D 51/16 | (2006.01) |
| F16K 17/28 | (2006.01) |
| H01M 2/10 | (2006.01) |
| H01M 2/12 | (2006.01) |
| B60L 11/18 | (2006.01) |
| B60K 1/00 | (2006.01) |

(52) U.S. Cl.
CPC ....... *H01M 2/1072* (2013.01); *B60K 2001/005* (2013.01); *Y02T 10/7005* (2013.01);
(Continued)

(58) Field of Classification Search
CPC .................. B60L 11/1874; B60K 2001/005; B62D 25/00; B62D 25/24; B65D 39/00; H01M 2/1205; H01M 2/1223; H01M 2/1072; H01M 2/1235; F16K 17/28

USPC ............... 220/203.01, 203.19, 203.2, 203.29, 220/227, 254.3, 367.1, 746, DIG. 6, 220/DIG. 32, DIG. 33; 296/208; 137/493.1, 137/354
See application file for complete search history.

(56) References Cited

U.S. PATENT DOCUMENTS 2,367,718 A * 1/1945 Farrell .......................... 114/197
3,212,520 A * 10/1965 Carlton ....................... 137/493.1
(Continued)

FOREIGN PATENT DOCUMENTS

| CN | 101171167 A | 4/2008 |
| DE | 44 18 740 A1 | 11/1995 |
(Continued)

OTHER PUBLICATIONS

International Search Report dated Nov. 11, 2010 with English translation (six (6) pages).
(Continued)

*Primary Examiner* — Fenn Mathew
*Assistant Examiner* — James N Smalley
(74) *Attorney, Agent, or Firm* — Crowell & Moring LLP

(57) ABSTRACT

A closure device provides an emergency degassing function, pressure equalization and condensate removal for a housing sealed off from the environment. The closure device has a frame, fastenable to a housing opening and having a frame opening, as well as a closure element, for closing the housing opening. The closure element is configured or arranged relative to the frame such that a path is formed in or through the closure element in a first closure position by the gravitational force acting on the closure element. The path enables an exchange of air between the housing interior and the environment as well as a discharge of condensation water. A second closure position, in which the path is sealed closed is producable by water impinging on the closure element from the environment. If a specified overpressure is exceeded, the closure element is detachable from the frame opening.

19 Claims, 7 Drawing Sheets

(52) U.S. Cl.
CPC .............. *Y02E 60/12* (2013.01); *H01M 2/1235* (2013.01); *H01M 2/1223* (2013.01); *B60L 11/1874* (2013.01); *Y02T 10/705* (2013.01); *H01M 2/1205* (2013.01)
USPC ..... 220/746; 220/227; 220/367.1; 220/254.3; 220/203.2; 296/208; 137/493.1

(56) References Cited

U.S. PATENT DOCUMENTS

| | | | |
|---|---|---|---|
| 3,630,787 A | | 12/1971 | Consolloy |
| 3,682,194 A | * | 8/1972 | Pyle ............................. 137/204 |
| 4,071,273 A | * | 1/1978 | Hack et al. ..................... 296/208 |
| 4,140,148 A | * | 2/1979 | Richter .......................... 137/240 |
| 4,463,774 A | * | 8/1984 | Gorges et al. ................. 137/81.1 |
| 4,930,659 A | * | 6/1990 | Sauber ........................... 220/787 |
| 4,953,742 A | | 9/1990 | Kraus ............................. 220/787 |
| 5,357,909 A | * | 10/1994 | Attinger et al. ............ 123/41.54 |
| 5,538,807 A | | 7/1996 | Hagiuda |
| 5,678,590 A | | 10/1997 | Kasugai et al. |
| 5,709,309 A | * | 1/1998 | Gallagher et al. ............. 220/229 |
| 5,940,878 A | | 8/1999 | Hattori et al. |
| 6,299,177 B1 | * | 10/2001 | Rehberg et al. ................ 277/634 |
| 2006/0201555 A1 | * | 9/2006 | Hamza .......................... 137/526 |
| 2006/0220376 A1 | * | 10/2006 | Pangallo et al. .............. 285/202 |
| 2008/0196770 A1 | | 8/2008 | Ruckel et al. |

FOREIGN PATENT DOCUMENTS

| | | |
|---|---|---|
| DE | 20 2005 016 906 U1 | 2/2006 |
| DE | 10 2005 027 282 A1 | 12/2006 |
| DE | 10 2005 033 476 A1 | 1/2007 |
| DE | 10 2005 051 618 A1 | 5/2007 |
| EP | 1 284 591 A2 | 2/2003 |
| GB | 2 289 795 A | 11/1995 |
| JP | 2003-229680 A | 8/2003 |
| JP | 2005-109107 A | 4/2005 |
| SU | 1082992 A1 | 3/1984 |
| WO | WO 2006134477 A2 * | 12/2006 |

OTHER PUBLICATIONS

German Search Report dated Oct. 25, 2011 with partial English translation (ten (10) pages).

English translation of Chinese Office Action dated May 15, 2014 (seven (7) pages).

* cited by examiner

CLOSURE DEVICE FOR A HOUSING, SEALED OFF FROM THE ENVIRONMENT, AND A HOUSING

CROSS-REFERENCE TO RELATED APPLICATIONS

This application is a continuation of PCT International Application No. PCT/EP2010/003892, filed Jun. 24, 2010, which claims priority under 35 U.S.C. §119 from German Patent Application No. DE 10 2009 037 181.8, filed Aug. 12, 2009, the entire disclosures of which are herein expressly incorporated by reference.

BACKGROUND AND SUMMARY OF THE INVENTION

The invention relates to a closure device for the combined provision of an emergency degassing function, a pressure equalization and a condensate removal for a housing, which is sealed off from the environment and which is provided to accommodate a technical component. Furthermore, the invention relates to a housing with such a closure device. In particular, the housing is a housing for a storage module of a vehicle.

Housings, which are provided for accommodating a technical component, such as a storage module for a vehicle, have to satisfy a number of requirements, in order to meet the changing operating conditions of a vehicle. Such a housing serves to protect the storage module against environmental influences, such as water and dirt. Therefore, the housing has to be configured so as to be sealed, in principle, up to a certain permissible amount of water ingress (so-called leakage rate). In the event that the aforementioned storage module is damaged due to extreme pressure in one or more of the storage cells and an adjoining opening of the storage cell(s), the gas flow issuing from the storage cell can cause a high overpressure in the housing in a short period of time. In order not to have to construct the housing so as to be pressure tight, an emergency degassing is, therefore, necessary, so that the overpressure generated in the housing can be reduced with an adequately large flow volume. The heat that is generated when the storage module is in operation is usually removed from the interior of the storage module by use of a cooler or, more specifically, a coolant evaporator. This approach makes it possible to produce a condensate that collects on the floor of the housing if the housing is sealed. Since this situation is undesirable in the long run, a discharge of the condensate is necessary. If the storage module disposed in the housing is used in a vehicle, then the changing operating conditions for example, in different temperature and/or altitude ranges—also make it mandatory to additionally provide a pressure equalizing device that adapts the pressure prevailing in the interior of the housing to match the ambient pressure.

In order to implement the above described functions—tightness, pressure release in the event of an emergency degassing of the storage cells, pressure equalization between the housing interior and the environment, discharge of condensate—there exist a plurality of solutions that are known from the prior art—separate in each individual instance. For example, there exist emergency degassing elements, for example, in the form of rupture disks and overpressure valves. Condensate drains or, in particular, water drains, as well as floats are used in the environment of vehicles, primarily at the openings of cavities in the vehicle body. Pressure equalizing elements, which minimize dirt and the ingress of air, are known, for example, from axle drives. Owing to the spatially restricted installation situation the aforementioned functions cannot be implemented by way of separate elements that handle a respective single function.

Therefore, the object of the present invention is to provide a closure device and a housing for the combined provision of an emergency degassing function, a pressure equalization, a condensate removal as well as a seal for an environment sealed housing that serves to accommodate a technical component.

These and other objects are achieved according to the invention by a closure device for the combined provision of an emergency degassing function, a pressure equalization and a condensate removal for a housing, which is sealed off from the environment, especially when travelling through water, and which is provided to accommodate a technical component, in particular, in a vehicle. The closure device comprises a frame, which can be fastened to a housing opening and which has a frame opening. Furthermore, the closure device comprises a closure element, which closes the housing opening. The closure element is designed in such a way and/or arranged relative to the frame in such a way that at least one path is formed in the closure element or through the closure element in a first closure position by the gravitational force acting on the closure element. The path enables an exchange of air between the interior of the housing and the environment as well as a discharge of condensation water. A second closure position, in which the path is closed in a sealing manner, can be produced by water impinging on the closure element from the environment. If a specified overpressure of the housing interior relative to the environment is exceeded, the closure element can be detached from the frame opening.

The housing is, for example, a housing for a storage module of a vehicle. The closure device according to the invention seals the housing in the direction of the exterior (that is, the environment) against water and dirt. If used in a vehicle, the housing or, more specifically the closure device, is exposed to these influences, for example, when travelling through water or in the event of splashing water. In the event that the component disposed in the housing is damaged, a closure device according to the invention makes it possible to reduce the overpressure, generated abruptly in the interior of the housing, with an adequately large flow volume. This feature eliminates the need to design the housing as a pressure vessel. The emergency degassing is guaranteed, for example, even if the technical component is designed as the actively cooled storage module, and the cooler has ruptured in the interior of the housing. Under normal operating conditions the closure device makes it possible to equalize the pressure in the interior of the housing relative to the environment, for example, when driving over a mountain pass. Finally, the closure device represents a contact safety device, because no contact can be made with the voltage carrying parts in the interior of the housing.

If the frame and/or the closure element is (are) made of a synthetic plastic material, as provided according to a preferred embodiment, then the closure device can be implemented in a simple and inexpensive way, because all of the components can be injection molded.

According to an additional practical embodiment, in the first and the second closure position, the closure element is pivotably fastened to the frame at a first side edge by way of a joint or hinge and is fastened in a form or force fitting manner to the frame at another side edge. The form and/or force fitting connection can be disconnected when the specified overpressure is exceeded, as a result of which a pivot movement from the first or second closure position into an open position takes place. In the event of an overpressure in the housing, the emergency degassing takes place by pivoting the closure element relative to the frame, as a result of which an opening, which is enlarged relative to the path mentioned above, is produced between the interior of the housing and the environment. This opening makes possible a rapid pressure equalization.

According to another practical embodiment, the area of the frame opening has a circumferential seal, especially in the form of a sealing lip. Another embodiment provides that, depending on the design of the closure element, the closure element is pressed against the seal in at least the second closure position. The circumferential seal serves to seal off the frame opening against the penetration of moisture, water and dirt when the closure element is in a position of contact that is, when the closure element is in the second closure position. In addition, the seal can be configured in the area of the frame opening in such a way that the frame of the closure device that is fastened to the housing is sealed off relative to the same.

According to a variant, the path, by way of which the pressure between the interior of the housing and the environment is equalized, runs at least in sections between the frame opening and the closure element. In this variant the closure element can be pressed as a whole against the edge of the frame opening. In an alternative embodiment the path runs through the closure element. According to this variant, the closure element is configured so as to be multi-part.

In an additional practical embodiment, the closure element includes a float, by which the path can be closed by water impinging on the float from outside of the interior of the housing (that is, from the direction of the surrounding area). By using the simple float principle it is possible to provide a simple and inexpensive closure device for sealing off the interior of the housing, for example, when travelling through water.

In particular, the closure element itself is configured as a float, as a result of which the closure element itself can be pressed against the edge of the frame opening or the seal. In an alternative embodiment the closure element includes a sealing element, which is connected to the float and which can be pressed against a flap of the closure element in order to close the path.

In this embodiment the path runs, for example, between the flap and the float. In another embodiment the float is the sealing element. In this embodiment the float—for example, in the form of a wood ball or an expanded polystyrene ball—takes over the sealing function in the second closure position.

An additional embodiment provides that the flap has a condensate discharge opening, where a fluid permeable knitted fabric or a diaphragm is disposed optionally in or over the condensate discharge opening. This strategy can further minimize an ingress of salt mist or dust into the interior of the housing. Furthermore, such a knitted fabric or diaphragm serves as protection against an explosion from the interior of the housing to the exterior and from the exterior to the interior.

Furthermore, the invention includes a housing for a device for supplying power—a so-called storage module—in particular, for a vehicle that includes the above described closure device. In particular, the closure device is disposed on the floor of the housing in the direction of the gravitation force.

Furthermore, it is provided that the closure device connects the interior of the housing to an exterior of the vehicle. This feature ensures, for example, that in the event of an emergency degassing due to a defect of the technical component in the interior of the housing, the resulting gases are not conveyed into the interior of the vehicle (passenger compartment).

An additional embodiment provides that the housing is made of a material that is pressure tight up to a specified pressure of the technical component, said specified pressure being defined by a fault scenario, in particular, a degassing event. As a result, the housing can be made of less expensive materials. In addition, it is possible to provide the housing with less weight.

It is practical for the housing to have a shaft, in which the closure device is disposed. As a result, the closure device is protected in the shaft of the housing so that the penetration of moisture and water is rendered even more difficult by the physical layout.

In addition, there is the option of providing the end of the shaft that faces the exterior of the vehicle with a flame resistant wire mesh.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
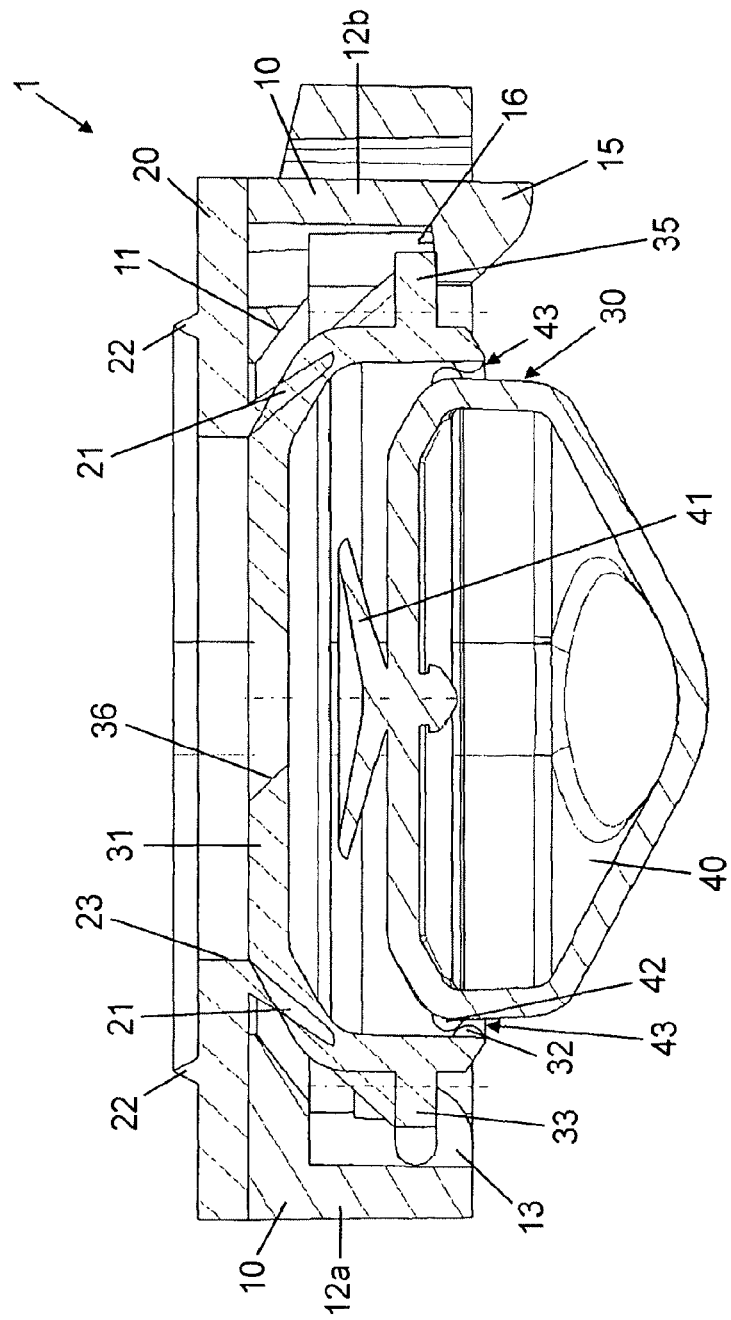
FIG. 1 is a cross-sectional view of an inventive closure device according to a first design variant.

FIG. 1 is a cross-sectional view of an inventive closure device 1, according to a first design variant, for the combined provision of an emergency degassing function, a pressure equalization and a condensate removal for a housing that is sealed off from the environment. The housing is not shown in FIG. 1. The closure device 1 is shown in the correct installation position, in which it is fastened to a floor of the housing. For reasons relating to cost and fabrication, all of the elements of the closure device—with the exception of the seal that is described in detail below—can be formed from a two component injection molded part.

The closure device 1 includes a frame 10 with a frame opening 11 formed therein. A top side of the frame 10 that is, the side that faces the interior of the housing—has a seal 20. This seal 20 has a size that matches the size of the frame 10. The center of the seal 20 has an opening 23, which is smaller than the frame opening 11 in the present exemplary embodiment. Thus, the seal 20 forms an upper closure of the frame 10. The seal 20 and the frame 10 can be designed as separate components, which are connected together during the production process. At the same time the connection does not have to be of a permanent nature. Rather the seal 20 can be merely placed on the top side of the frame 10. As an alternative, the frame 10 and the seal 20 can be implemented in a common component, which is made, for example, by the known two component injection molding process.

The opening 23 of the seal 20 is encircled by a sealing bead 22, which rests sealingly against the floor of the housing after installation of the closure device into the housing. In this case the opening 23 of the seal 20 and the frame opening 11 are arranged so as to correspond to an opening in the floor of the housing. A circumferential sealing lip 21 extends at an angle away from the edge of the opening 23 (the pushing away is not shown in the drawing). Thus, the sealing lip 21 completely encircles the opening 23 and is deformable under pressure owing to its cross-sectional wing-like shape.

In the exemplary embodiment shown in FIG. 1, a flap 31 of a sealing element 30 permanently pushes against the sealing lip 21. Besides the flap 31, adjacent to the sealing lip 21 under normal operating conditions, the closure element 30 additionally includes a float 40 having a main surface, which faces the flap 31 and on which there is a sealing element 41. The sealing element 41 is arranged on the float 40 so as to correspond to a condensate discharge opening 36 in the flap 31. Contrary to the drawing, the condensate discharge opening 36 can be closed with a gas and fluid permeable knitted fabric or diaphragm.

In the normal operating position shown in FIG. 1, that is, no overpressure is prevailing in the interior of the housing, the sealing element 41 is arranged so as to be positioned at a distance from the condensate discharge opening 36. The size of the float 40 is adapted to the size of the flap 31 in such a way that a gap 43 is produced between the adjoining side walls of the float 30 and the cup shaped flap 31. The gap 43, surrounding the float 40, the condensate discharge opening 36 in the flap 31 and the opening 23 of the seal 20 produce a path that connects the interior of the housing to the environment. This state enables an air exchange between the interior of the housing and the environment as well as the discharge of condensation water from the interior of the housing in the so-called first closure position shown in FIG. 1.

The float 40 is mounted in a moveable manner in the flap 31. The edge of the flap 31 that faces the environment has a bead 32 in at least two opposing locations. Corresponding hereto, each side edge of the float 40 has a bead 42 that is interrupted in a plurality of places (interruptions cannot be seen in the cross-sectional view). This feature ensures that the float 40 cannot slide out of the flap 31 by way of the position shown in FIG. 1 and makes possible a pressure equalization and discharge of the condensate. In contrast, a movement of the float 40 in the direction of the floor (underside) of the flap 31 is made possible, for example, by water impinging (for example, when travelling through water) on the closure device 1. The result is that the sealing element 41 is pressed against the floor of the flap 31, so that the condensate discharge opening 36 is closed. This position is referred to as the second closure position and causes the path, formed between the interior of the housing and the environment, to be closed. It is very clear from the cross-sectional view in FIG. 1 that for a reliable seal the diameter of the sealing element 41 of the float is designed larger than that of the condensate discharge opening 36.

On exceeding a specified overpressure of the interior of the housing relative to the environment, the closure device 1 allows the overpressure to be reduced by way of an opening (the opening 23 of the seal 20 in the exemplary embodiment), which allows a much larger flow volume than the above described path. For this purpose, the closure element 30 is pivotably mounted on the frame 10. One wall 12a of the frame 10 has a hook shaped receptacle 13 for a joint 33 of the flap 31. The opposite wall 12b of the frame 10 has an engagement hook 15 having a contact surface 16, on which a contact surface 35 of the closure element—more specifically the flap 31—rests. When overpressure occurs, the wall 12b with the engagement hook 16 deforms, so that the closure element 30 is pivoted about the joint 13, 33. In order to reduce the overpressure there is now a path that is determined by the size of the opening 23 of the seal 20.

Figure 2:
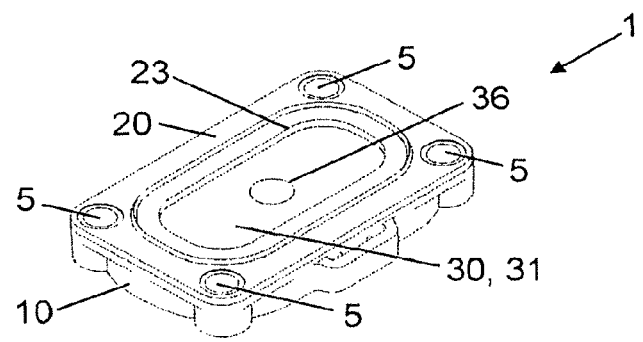
FIG. 2 is a perspective view of the closure device, according to FIG. 1, from the top.
Figure 3:
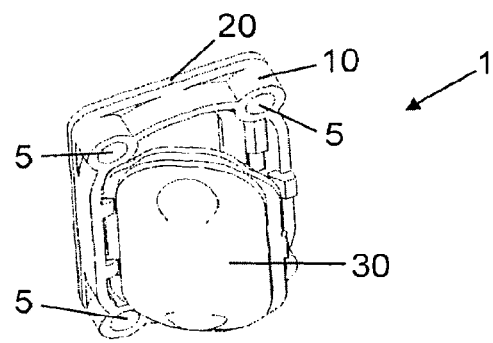
FIG. 3 is a perspective view of the closure device, according to FIG. 1, from the bottom with the closure element in an open position.
Figure 4:
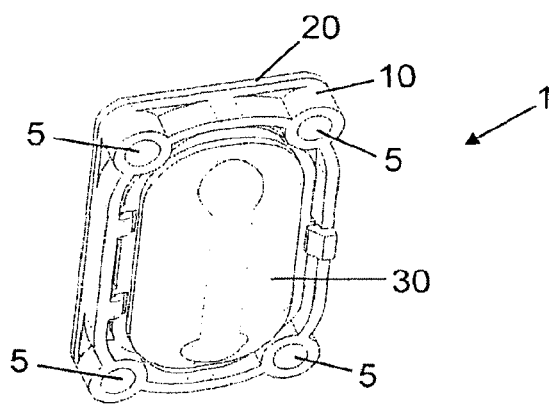
FIG. 4 is a perspective view of the closure device, according to FIG. 1, from the bottom with the closure element in a closed position.

FIGS. 2 to 4 show the closure device from FIG. 1 in various perspective views. FIG. 2 is a perspective view of the top side. It shows very clearly that the flap 31 of the closure element 30 has a condensate discharge opening 36 that lies in the area of the opening 23 of the seal 20. Furthermore, it shows clearly four boreholes 5, by way of which the closure device can be fastened with screws to the housing. FIG. 3 shows the closure device 1 from the bottom with the closure element 30 in the open position, a state that is generated if a specified overpressure of the housing interior relative to the environment is exceeded. FIG. 4 is a perspective view from the bottom with the closure element 30 in the first closure position relative to the frame 10.

Figure 5:
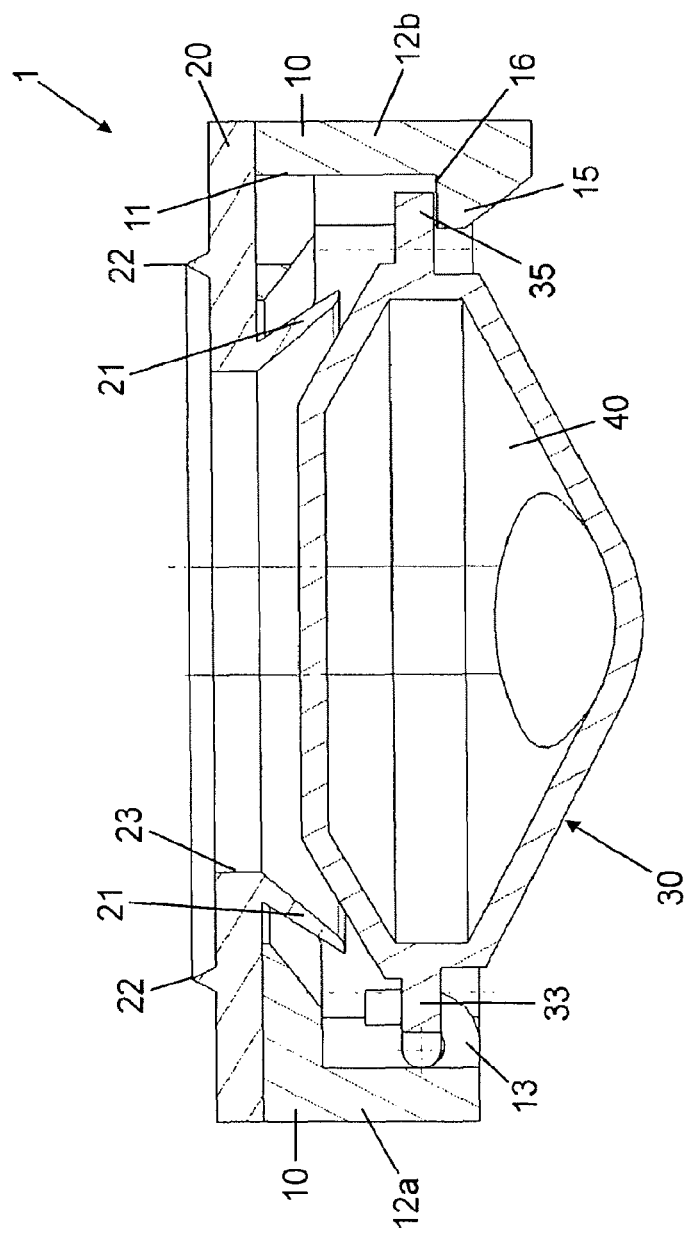
FIG. 5 is a schematic cross-sectional view of an inventive closure device according to a second design variant.

FIG. 5 is a schematic cross-sectional view of an inventive closure device 1 according to a second exemplary embodiment. In contrast to the previous exemplary embodiment according to FIG. 1, the closure element 30 is formed as one piece. In this design variant, the closure element 30 forms the float 40 itself. Therefore, in the first closure position the closure element 30 is set apart from the sealing lip 21 of the seal 20 that is placed on the top side of the frame 10. This configuration can be implemented, for example, by suitably shaping the side of the closure element 30 that faces the opening 23 or by the disposition of the joint mechanism. The closure element 30, pivotably mounted on the receptacle 13 of the frame 10, engages with the engagement hook 16, thereby forming the aforementioned gap between the sealing lip 21 and the closure element 30.

This gap and the spaces, formed between the respective walls 12a and 12b and the side walls of the closure element 30, can enable both a pressure equalization and a discharge of the condensation water. When travelling through water or in the event of a jet of water from below that is, from the surrounding area—the closure element 30, formed as a float, is pushed in the direction of the sealing lip 21, thus sealing off the interior of the housing from the environment. In the case of a fault of the technical component disposed in the housing, the pressure in the interior of the housing is applied from above the closure element 30. After a specified internal pressure the closure element 30 opens, so that the engagement hook 15 falls back, and a gas flow can escape through the opening 23.

Figure 6:
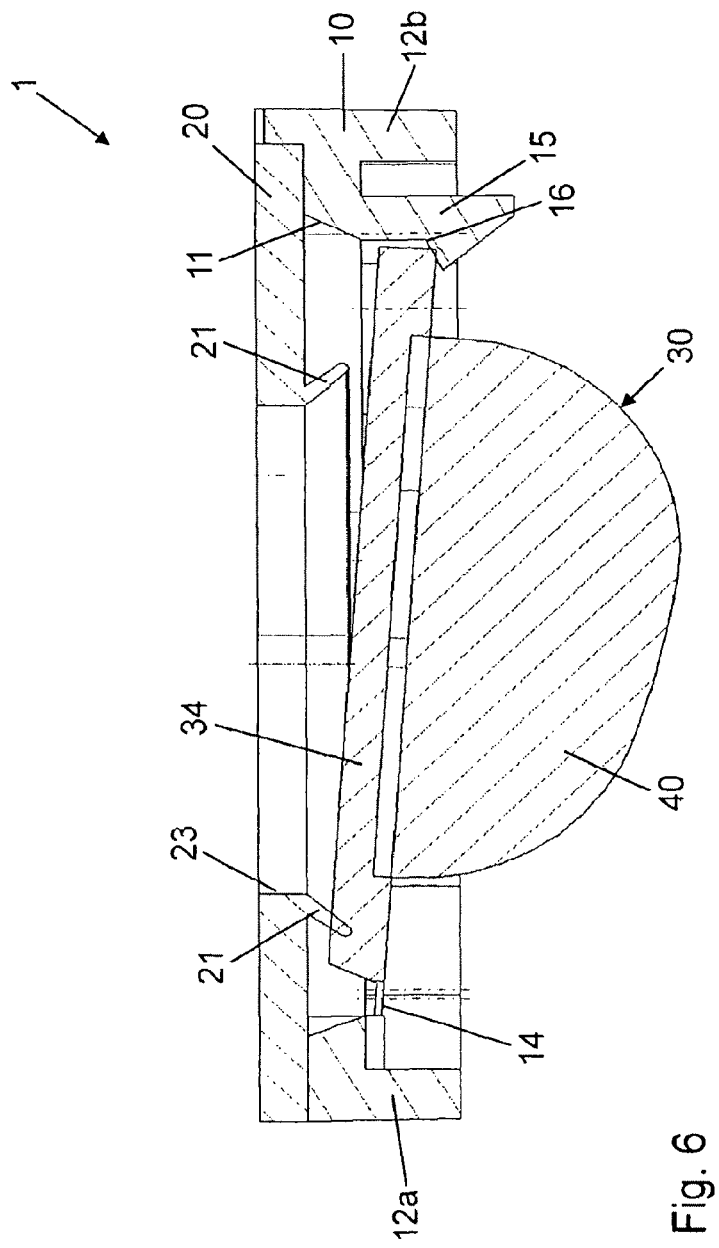
FIG. 6 is a schematic cross-sectional view of an inventive closure device according to a third design variant.

FIG. 6 shows a modification of the exemplary embodiment from FIG. 5. In this exemplary embodiment the rotatable mounting is formed by a film hinge 14. In this exemplary embodiment the pressure equalization and the discharge of condensation water takes place through a gap that is formed between the sealing lip 21 in the right half of the figure and the closure element 30. Furthermore, the pressure equalization and the discharge of condensation water can take place by way of the space formed between the engagement hook 15 and the side wall of the float 40. In this exemplary embodiment the closure element 30 is formed by a closure plate 34 and a float 40 attached thereto. If the float is pushed from the bottom to the top by water, then the closure element 30 rotates about the film hinge 14 in the counter-clockwise direction, so that the closure plate 34 is pressed against the sealing lip 21. In the case of a fault due to the overpressure prevailing in the interior of the housing, the engagement hook 15 in turn gives way, so that the closure element 30 opens in the clockwise direction by means of a pivot movement.

Figure 7:
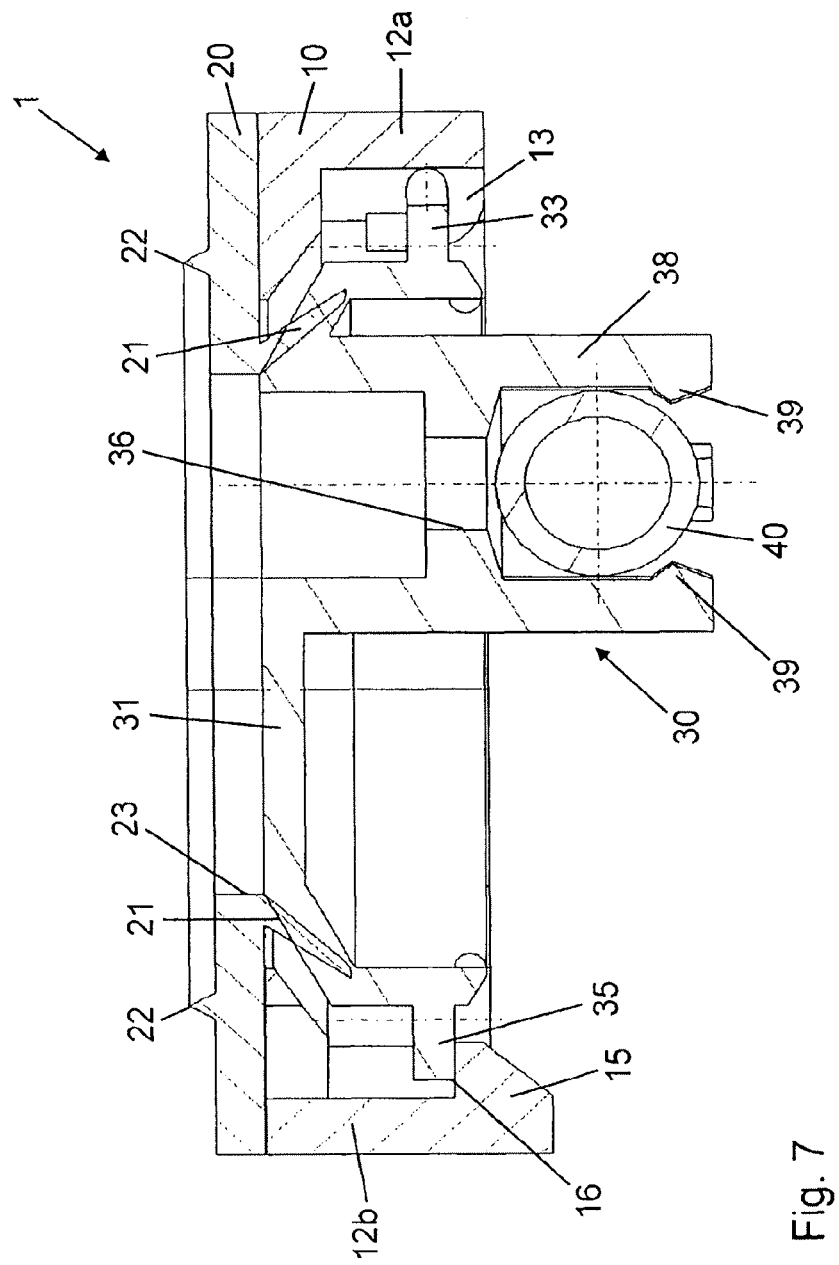
FIG. 7 is a schematic cross-sectional view of an inventive closure device according to a fourth design variant.

FIG. 7 is a schematic cross-sectional view of a fourth exemplary embodiment of a closure device 1 according to the invention. The fourth exemplary embodiment is based on the first exemplary embodiment, described in connection with FIG. 1, and has a two part closure element. In the first closure position the flap 31 is pressed firmly against the sealing lip 21. The path for pressure equalization is ensured by a cylindrical section 38, which is formed on the flap 31 and which has the condensate discharge opening 36 approximately in the center. The ends of the cylindrical section 38 are provided with projections 39. Between the wall with the condensate discharge opening 36 and the projections 39 there is a spherical float 40—for example, in the form of an expanded polystyrene or wood ball. The size of the float 40 is dimensioned in such a way that there is sufficient space between it and the cylindrical section 38, thus rendering feasible the path, required for the pressure equalization, between the interior of the housing and the environment. The float 40 is positioned in a moveable manner in the cylindrical section 38, so that when travelling through water or in the event of a jet of water from the bottom to the top, the float is pushed against the condensate discharge opening 36, preferably in the form of a borehole, and seals off the interior of the housing from the environment. Optionally, a water permeable knitted fabric (for example, a wick) or a diaphragm, both of which further restrict the ingress of salt mist and water vapor into the interior of the housing, can be provided in or over the condensate discharge opening 36. In addition, in the event of a malfunction of the float 40, the water ingress into the interior of the housing is reduced. In the event of an overpressure, the closure devices, depicted in FIGS. 1 to 5, exhibit the function of the closure device 1, so that the closure element 30 is pivoted about the joint mechanism 13, 33 as a function of the closure devices.

Figure 8:
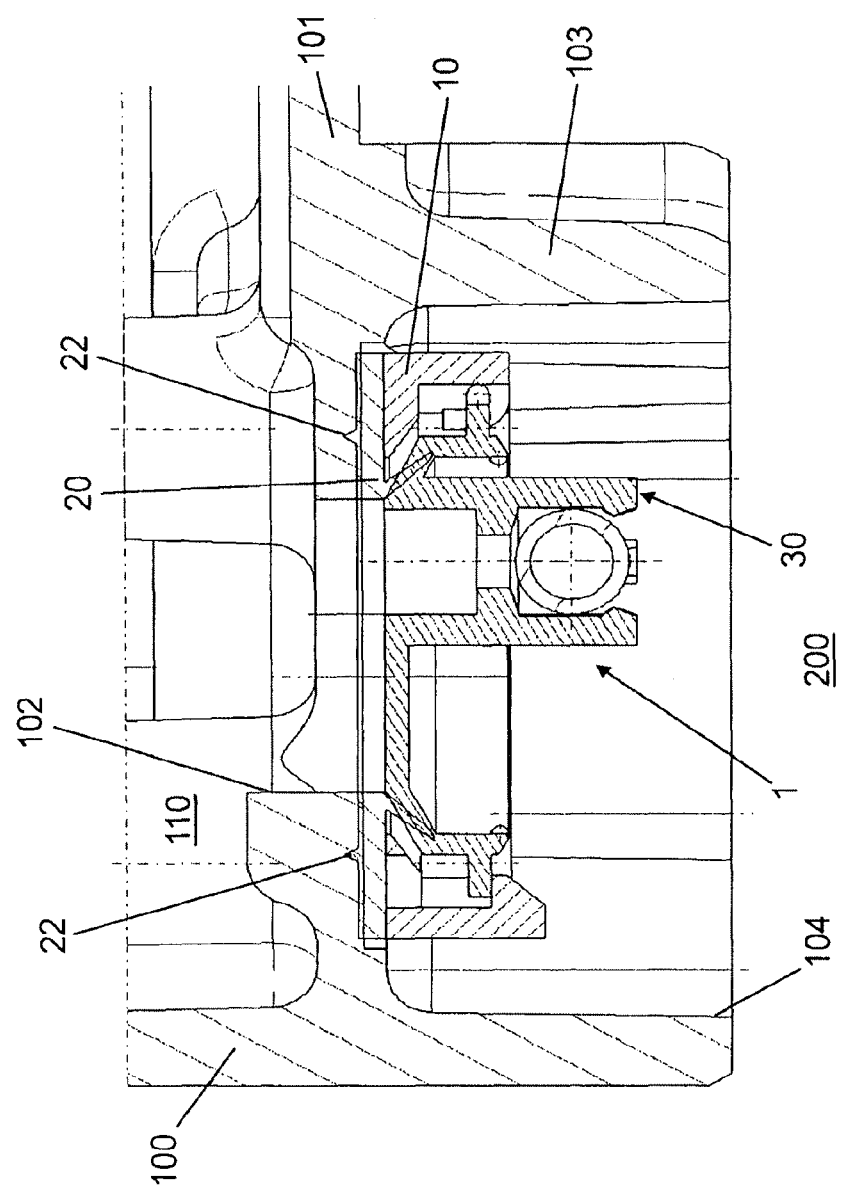
FIG. 8 is a schematic cross-sectional view of the closure device, which is depicted in FIG. 7 and which is incorporated into a housing.
Figure 9:
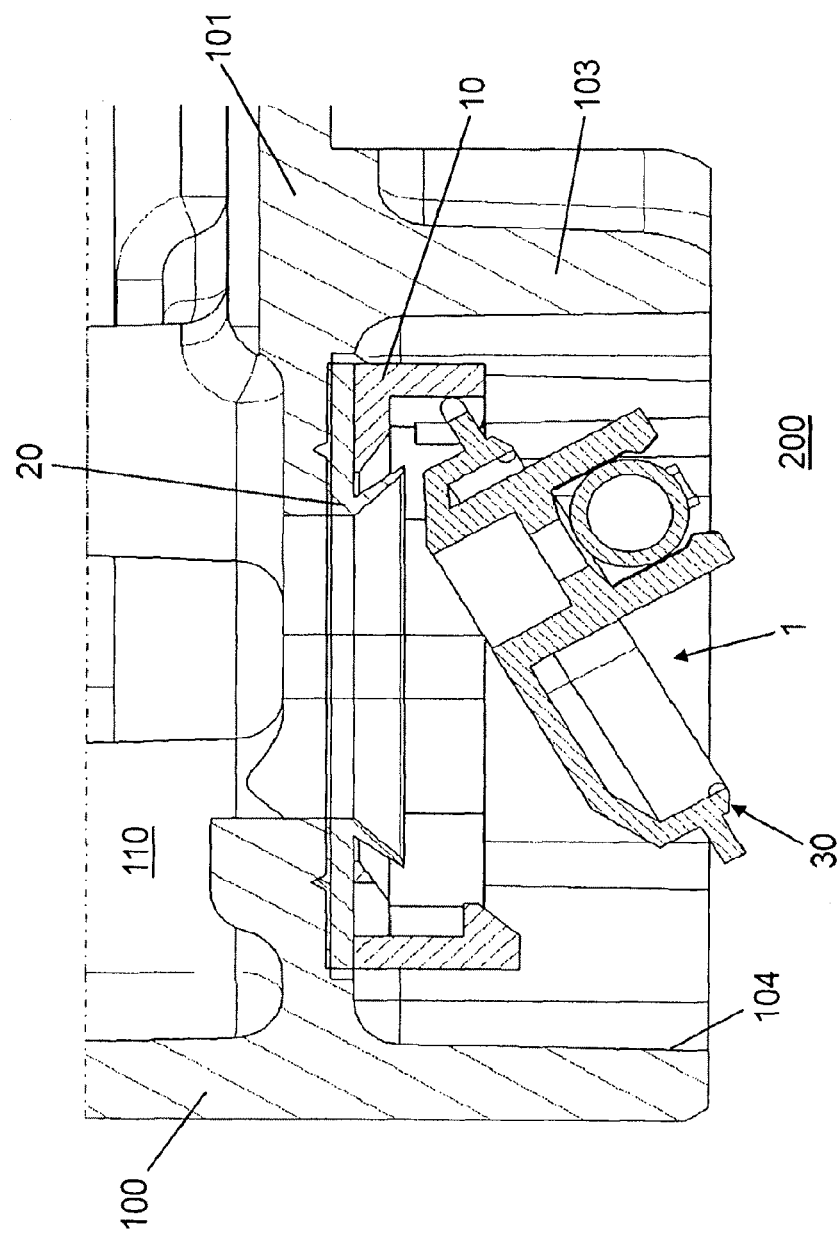
FIG. 9 is a schematic cross-sectional view of the closure device, which is incorporated into a housing according to FIG. 7, with the closure element in the open position.

FIGS. 8 and 9 are, in each instance, a cross-sectional view of the closure device, depicted in FIG. 7, in a housing 100. In this respect FIG. 8 shows the closure device 1 in its first closure position. FIG. 9 shows the situation, in which a specified internal pressure of the interior of the housing was exceeded, so that the closure element 30 deflects relative to the frame 10. The housing 100 serves, for example, to accommodate a storage module, as used for electrified drives. Such a storage module includes a plurality of storage cells, which have to be cooled owing to the heat that is generated under normal operating conditions. In the event of a defect, a so-called thermal event, the situation may arise, for example, that the storage cell is opened, so that a gas flow escapes from the storage cell and, in so doing, generates an overpressure in the housing interior 110. The invention enables the use of a housing that is not designed so as to be pressure tight, because the function of an emergency degassing operation is taken over by one of the above described closure devices.

The housing 100 is shown only as a detail in the FIGS. 8 and 9 respectively. The closure device 1 is disposed in a housing shaft 103 of the housing 100. The housing shaft 103 is arranged preferably at the lowest point in the floor 101 of the housing 100 and is connected to a vehicle exterior 200. In the event of an emergency degassing, the gas escapes into the vehicle exterior and not into the vehicle interior. The closure device 1 is connected to the housing 100 preferably by means of a number of threaded connections. The figures show very clearly that the sealing bead 22 of the seal 20 is pressed firmly against the housing 100 in order to seal off the connection. The sealing bead 22 encircles the housing opening 102 in its entirety and is compressed in the installation position, a feature that is not shown in the figure. The end 104 of the housing shaft 103 that faces away from the closure device 1 can have a flame resistant wire mesh, which is not shown in the figures.

The closure device according to the invention makes possible the combined provision of an emergency degassing, a pressure equalization and a discharge of condensate in one component. The closure device seals off the interior of the housing from water and dirt in the direction of the environment. In the event that a technical component in the interior of the housing is damaged, any overpressure that is generated as a result can escape from the housing in a targeted way. This function, which is called the emergency degassing, makes it possible to fabricate the housing of an inexpensive material that is pressure resistant only to a limited extent—that is, up to a specified maximum pressure. Similarly, it enables the discharge of any condensate that is produced. Finally, under normal operating conditions, a pressure equalization of the storage interior with the environment is provided. All of the functions can be implemented at minimal cost.

LIST OF REFERENCE NUMERALS 1 closure device
5 boreholes
10 frame
11 frame opening
12a, 12b wall
13 receptacle for joint
14 film hinge
15 engagement hook
16 contact surface of the engagement hook
20 seal
21 sealing lip
22 sealing bead
23 opening
30 closure element
31 flap
32 bead
33 joint
34 closure plate
35 contact surface of the closure element
36 condensate discharge opening
37 water impermeable knitted fabric/diaphragm
38 cylindrical section
39 projection
40 float
41 sealing element of the float
42 bead
43 gap
100 housing
101 floor of the housing
102 housing opening
103 housing shaft
104 end of the housing shaft
110 housing interior
200 environment/vehicle exterior The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A closure device for use in providing an emergency degassing function, a pressure equalization function, and a condensate removal function for a housing sealed off from an environment, the housing being adapted to hold a technical component, the closure device comprising:
 a frame fastenable to an opening of the housing, the frame having a frame opening;
 a closure element operatively configured to close the housing opening, wherein the closure element is at least one of configured and arranged relative to the frame such that:
  in a first closure position, at least one path is formed in or through the closure element via gravitational force acting on the closure element, the at least one path allowing for an exchange of air and a discharge of condensation water between an interior of the housing and the environment;
  in a second closure position produced by water impinging on the closure element from the environment, the at least one path is closed in a sealing manner; and
  upon exceeding a specified overpressure of the interior of the housing relative to the environment, the closure element being detachable from the frame opening,
 wherein the closure element is pivotably fastened to the frame at a first side edge in the first and the second closure positions, the closure element being fastened in a form or force-fitting manner to the frame at another side edge, and
 wherein the form or force-fitting connection is disconnectable when the specified overpressure is exceeded to allow for a pivoting movement from the first or the second closure position into a detached open position.

2. The closure device according to claim 1, wherein at least one of the frame and the closure element are made of a synthetic plastic material.

3. The closure device according to claim 1, further comprising:
 a circumferential seal operatively arranged in an area of the frame opening.

4. The closure device according to claim 3, wherein the circumferential seal comprising a sealing lip.

5. The closure device according to claim 3, wherein the closure element is pressed against the circumferential seal in at least the second closure position.

6. The closure device according to claim 1, wherein the at least one path runs at least in sections between the frame opening and the closure element.

7. The closure device according to claim 1, wherein the at least one path runs through the closure element.

8. The closure device according to claim 1, wherein the closure element comprises a float by which the path is closable upon water impinging on the float from outside the exterior of the housing.

9. The closure device according to claim 8, wherein the float forms the closure element, the closure element being pressed against the edge of the frame opening or a circumferential seal arranged in an area of the frame opening.

10. The closure device according to claim 8, wherein the closure element further comprises a sealing element, the sealing element being connected to the float and being pressable against a flap of the closure element in order to close the path.

11. The closure device according to claim 10, wherein the sealing element is integral with the float.

12. The closure device according to claim 10, wherein a condensate discharge opening is provided in the flap.

13. The closure device according to claim 12, further comprising one of a fluid permeable knitted fabric and a diaphragm disposed in or over the condensate discharge opening.

14. A housing for a power supplying device for use in a vehicle, the housing comprising:
 a housing opening;
 a closure device providing an emergency degassing function, a pressure equalization function, and a condensate removal function for the housing, wherein the closure device comprises:
  a frame fastenable to the housing opening, the frame having a frame opening;
  a closure element operatively configured to close the housing opening, wherein the closure element is at least one of configured and arranged relative to the frame such that:
   in a first closure position, at least one path is formed in or through the closure element via gravitational force acting on the closure element, the at least one path allowing for an exchange of air and a discharge of condensation water between an interior of the housing and the environment;
   in a second closure position produced by water impinging on the closure element from the environment, the at least one path is closed in a sealing manner; and
   upon exceeding a specified overpressure of the interior of the housing relative to the environment, the closure element being detachable from the frame opening,
  wherein the closure element is pivotably fastened to the frame at a first side edge in the first and the second closure positions, the closure element being fastened in a form or force-fitting manner to the frame at another side edge, and
  wherein the form or force-fitting connection is disconnectable when the specified overpressure is exceeded to allow for a pivoting movement from the first or the second closure position into a detached open position.

15. The housing according to claim 14, wherein the closure device is disposed on a floor of the housing in a direction of the gravitation force.

16. The housing according to claim 14, wherein the closure device connects the interior of the housing to a vehicle exterior.

17. The housing according to claim 14, wherein the housing is made of a material that is pressure tight up to a specified pressure of a technical component arranged in the housing, said specified pressure being defined by a fault scenario.

18. The housing according to claim 14, wherein the housing comprises a shaft portion in which the closure device is disposed.

19. The housing according to claim 18, wherein an end of the shaft portion facing in a direction of the vehicle exterior is provided with a flame resistant wire mesh.

* * * * *